United States Patent Office 3,397,055
Patented Aug. 13, 1968

3,397,055
METHOD FOR THE CONTROL OF PLANT GROWTH
Edward D. Weil, Yonkers, and Edwin Dorfman, Grand Island, N.Y., assignors to Hooker Chemical Corporation, Niagara Falls, N.Y., a corporation of New York
No Drawing. Continuation-in-part of application Ser. No. 260,078, Feb. 20, 1963. This application May 5, 1966, Ser. No. 547,753
6 Claims. (Cl. 71—115)

This is a continuation-in-part of our parent application Ser. No. 260,078, filed Feb. 20, 1963, now abandoned which was a continuation-in-part of our earlier application Ser. No. 839,299, filed Sept. 11, 1959, now abandoned.

The invention relates to new compositions of matter useful as herbicides, chemical intermediates, and biological toxicants, and to methods of preparing and using said compositions. More specifically, this invention resides in the new composition of matter aminotrihalophenylacetic acid and its salts, wherein the halogen is selected from the group consisting of chlorine, bromine and mixtures thereof. Such products have unique properties as selective herbicides, which properties are not logically predictable from known properties of other compounds in their series.

The compounds of the invention can be prepared as described herein. The nitro group of 5-nitro-2,3,6-trichlorophenylacetic acid (the preparation of 5-nitro-2,3,6-trichlorophenylacetic acid is described in U.S. 3,009,806) is reduced to amino. A preferred method is by hydrogenation in the presence of a nickel catalyst or a noble metal catalyst, although other reducing agents, such as zinc, iron, tin, ferrous hydroxide, or the like, may also be used. The free acid may be converted to a salt by reaction with either a base such as sodium hydroxide, potassium hydroxide, ammonia or amine, or with an acid, such as hydrochloric or sulfuric acid. The utility of the compounds as herbicides is not significantly influenced by the particular base or acid used to prepare the salts, and it is believed that these salts may all become converted to the free 5-amino-2,3,6-trichlorophenylacetic acid in the soil. In a similar way, those derivatives of 5-amino-2,3,6-trichlorophenylacetic acid, such as the esters and amides thereof, which readily hydrolyze to 5-amino-2,3,6-trichlorophenylacetic acid under the mild conditions encountered in moist soil at ambient temperatures, may be employed in place of the free acid to obtain similar results. We prefer to employ the sodium salt of 5-amino-2,3,6-trichlorophenylacetic acid or a salt of a simple organic amine such as dimethylamine, such salts being water soluble. The compound of the invention also forms salts with strong acids, such as hydrochloric acid, and may be employed in the form of such salts, if desired.

It is important in agricultural practice to use a plant growth regulator which will control weeds but which will have little or no adverse effect on the crops in the treated area. One of the most difficult problems in the herbicidal art has been to control both broadleaf weeds and grasses in those crops which are sensitive to chemical herbicides. Such crops include many legumes and vegetables, such as soybeans, cotton, lettuce, sweet potatoes, melons, carrots and others. Many prior art herbicides, including 2,4-dichlorophenoxyacetic acid and its salts, cannot be employed in the above-mentioned crops since the crops are readily damaged thereby. Certain chloroacetamides have been utilized to control grassy weeds in such crops, but are lacking in effectiveness on broadleaf weeds. Petroleum oils have had some utility in weeding carrots, but, unfortunately, these oils apparently lack persistance in the soil and are expensive to use. This technique of using oils also appears limited to weeding of carrot and cotton crops. There is, therefore, a great need in the art for an inexpensive selective compound capable of controlling both broadleaf and grassy weeds without damage to sensitive crops, and having the ability of controlling weeds over a period of many weeks following a single application. The invention makes available compositions which are inexpensive to use and fills this above long felt need. This invention also makes available new compositions of matter useful as intermediates and biological toxicants. To avoid a costly separation procedure, we prefer to employ the compound of the invention in the form of a technical mixture with isomeric aminotrichlorophenylacetic acids, which do not detract from the herbicidal activity of the active isomer; and show, in some cases, a contributory action thereto, although these others by themselves are inactive.

These other isomers which can be present include the 3 - amino-2,4,5-trichloro-, 5-amino-2,3,4-trichloro- and 3-amino-2,4,6-trichlorophenylacetic acid. A particularly preferred mixture because of its low cost is that prepared by nitrating (and then reducing the nitro group to amino) commercial trichlorophenylacetic acid which, being made from the trichlorination product of toluene, contains between about 30 and about 75 percent 2,3,6-trichlorophenylacetic acid, the remainder being the 2,4,5-, 2,3,4- and 2,4,6-trichlorophenylacetic acids. This mixture upon nitration and reduction therefore yields a mixed aminotrichlorophenylacetic acid containing between about 30 and about 75 percent of 5-amino-2,3,6-trichlorophenylacetic acid, the remainder being mostly 3-amino-2,4,5-trichlorophenylacetic acid, 5 - amino - 2,3,4 - trichlorophenylacetic acid and 3-amino-2,4,6-trichlorophenylacetic acid. The salts and esters of the said aminotrichlorophenylacetic acids, analogous to the salts and esters of the pure isomer, may also be employed.

We have found that 5-amino-2,3,6-trichlorophenylacetic acid and the salts thereof are selective herbicides having the desirable combination of properties outlined previously. These compounds are new compositions of matter and exhibit properties which could not have been logically predicted from the known properties of related compounds. It is furthermore surprising that 5-amino-2,3,6-trichlorophenylacetic acid should have utility for weed control in herbicide sensitive crops since the ordinary herbicidal chlorinated phenylacetic acids are extremely damaging to all of these crops and would not be used for weed control in these crops.

The compounds of the invention may be employed in aqueous solutions or in organic solvents, such as hydrocarbons or alcohols. Solid carriers such as clay, talc, or vermiculite may also be employed. The various formulation adjuvants known to the herbicide art may be employed with these compounds. For example, wetting agents, dispersing agents, emulsifiers, sequestrants, and the like, may be used. Also, combinations of these herbicides with other herbicides may be used, for example with N,N-diallyl-α-chloro acetamide, ethyl N,N-dipropyl thiocarbamate, and similar compounds which do not destroy the crop tolerance characteristic of the compounds of the invention, and which can reinforce the herbicidal action toward certain weed species.

Alternatively, the mixed active ingredients of this invention may be used in the place of said compounds.

The preferred method of application is to apply the chemicals to the soil prior to the emergence of crops, however, post-emergence applications are also effective against certain weeds. Rates of 1–8 pounds per acre are preferred, but up to 100 pounds per acre may be used.

Suitable salts of the herbicide acids include those which contain an inorganic or organic cation such as the alkali metals, sodium and potassium, the alkaline earth metals, calcium, strontium, barium and magnesium considered herein to be in that class, other metals such as aluminum, iron, cobalt, nickel, zinc, cadmium, mercury, copper and other cations such as ammonium, mono-, di- and tri-hydrocarbyl-substituted ammonium, mono-, di- and tri-alkanolammonium and mixed alkylalkanol-ammonium in chemical combination with a 5-amino-2,3,6-trichlorophenylacetate anion or such number of such anions as is demanded to satisfy valence requirements.

The alkylammonium salts such as monoalkylammonium, dialkylammonium, or trialkylammonium, usually have from 1 to 18 carbon atoms in each alkyl group, the total number of carbon atoms preferably being not more than 18. The alkanolammonium salts such as monoalkanolammonium, dialkanolammonium, or trialkanolammonium preferably have from 2 to 3 carbon atoms in each alkanol group. The mixed alkylalkanolammonium salts such as monoalkyl monoalkanolammonium, dialkyl monoalkanolammonium, or monoalkyl dialkanolammonium preferably have from 1 to 4 carbon atoms in each alkyl group and from 2 to 3 carbon atoms in each alkanol group.

Examples of monoalkylammonium salts are the monomethylammonium, monoethylammonium, monopropylammonium, monobutylammonium, monoamylammonium, monohexylammonium, monoheptylammonium, monooctylammonium, monononylammonium, monodecylammonium, monoundecylammonium, monododecylammonium, and similar monoalkylammonium salts of 5-amino-2,3,6-trichlorophenylacetic acid.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of 5-amino-2,3,6-trichlorophenylacetic acid.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, dimethyllaurylammonium, dimethylstearylammonium and similar salts of 5-amino-2,3,6-trichlorophenylacetic acid.

Examples of monoalkanolammonium salts are the monoethanolammonium, monopropanol ammonium, and similar salts of 5-amino-2,3,6-trichlorophenylactic acid.

Examples of dialkanolammonium salts are the diethanolammonium, dipropanolammonium, ethanolpropanolammonium and similar salts of 5-amino-2,3,6-trichlorophenylacetic acid.

Examples of trialkanolammonium salts are the triethanolammonium, tripropanolammonium, ethanoldipropanolammonium, propanoldiethanolammonium, and similar salts of 5-amino-2,3,6-trichlorophenylacetic acid.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of 5-amino-2,3,6-trichlorophenylacetic acid.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium ethylpropylpropanolammonium, propylbutylethanolammonium, propylbutylpropanolammonium, and similar salts of 5-amino-2,3,6-trichlorophenylacetic acid.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of 5-amino-2,3,6-trichlorophenylacetic acid.

Examples of dialkylammonium salts in which the radicals are conjoined to form a ring, are piperidinium, pyrrolidinium and morpholinium salts. Examples of trialkylammonium salts in which the radicals are conjoined to form a ring are N-methylmorpholinium salts. Examples of alkylammonium salts in which the alkyl group are cycloaliphatic, include cyclohexylammonium and dicyclohexylammonium salts of 5-amino-2,3,6-trichlorophenylacetic acid.

Examples of hydrocarbylammonium salts in which the hydrocarbyl radical is aromatic include the anilinium, the N-methylanilinium, the N,N-dimethylanilinium, the naphthylammonium, and the benzylammonium salts of 5-amino-2,3,6-trichlorophenylacetic acid.

Also the lower alkyl substituted and unsubstituted esters of these acids are included within the scope of this invention for example, the methyl, ethyl, butyl, lauryl, cyclohexyl, 2-hydroxyethyl, 2-chloroethyl, allyl, phenyl, benzyl, trichlorobenzyl, polychlorophenyl, 1,2-ethylene (bis), glyceryl (mono-, bis- or tris-), methoxyethyl furfuryl, or other esters, as well as thio-analogues of these. These esters are prepared by refluxing the free acids with the alcohols, or by first reacting the acid with thionyl chloride to prepare the acid chloride, and then refluxing with the alcohol to convert the acid chloride to the ester. The thioesters can be prepared by reacting the acid chloride with a mercaptide, or by treating the ordinary ester with $P_2S_5$ in refluxing toluene.

The amides of these said acids are included within the scope of this invention, for example, the simple amide and the N-unsubstituted amides of the acids of the invention. Also, the N-methyl, N,N-dimethyl, N-phenyl, N-hydroxyethyl amides, and the like, as well as the thio-analogues of these. These amides can be prepared by treating the acid chloride with ammonia or an amine. In addition, the anhydrides, the acid chlorides and the thioanhydrides will hydrolyze to the acids and may be used. The anhydrides or the thioanhydrides are made by adding one-half mole of water or $H_2S$, respectively, to the acid chloride in the presence of two moles of a base, such as pyridine.

While all of these derivatives have herbicidal utility, certain ones are preferred because of high activity and ease of formulation. These preferred derivatives are the free acids, the water-soluble salts, e.g., the alkali metal salts, ammonium, N-(lower alkyl)-substituted ammonium salts (having from 1 to 6 carbon atoms per alkyl group), the mono-, di-, and triethanolammonium salts, the mono-, di-, and tripropanolammonium salts, the N-methylmorpholinium salt and the unsubstituted amides.

In addition, the bromo derivatives of amino-trihalophenylacetic acid and their salts are also embraced within the scope of this invention. Such compounds include 5-amino-2,3,6-tribromophenylacetic acid and salts thereof, mixed 5-amino-tribromophenylacetic acid and salts thereof and mixed halogen derivatives such as 5-amino-chlorodibromophenylacetic acid and its salts, and 5-amino-dichlorobromophenylacetic acid and its salts. Where, in the above recitation of compounds within this invention, various aminotrihalophenylacetic acids and derivatives thereof are mentioned, it should be considered that these are preferably employed as mixtures, containing about 30 to 75 percent, preferably about 40 to 50 percent of 5-amino-2,3,6-trichlorophenylacetic acid or salts, esters or amides or mixtures thereof, with 70 to 25 percent of other aminotrichlorophenylacetic acid or corresponding salt, amide, ester or mixture. Of course, in addition to the aminotrichlorophenylacetic acids, other herbicides, adjuvants, carriers, wetting agents and so forth may be used.

To further illustrate our invention, the following examples are given:

Example 1.—Preparation of 5-amino-2,3,6-trichlorophenylacetic acid

A mixture of five parts of weight of 5-nitro-2,3,6-trichlorophenylacetic acid (preparation of which is described in U.S. Patent 3,009,806), ten parts of water, thirty-five parts of methanol, and about two parts of commercial Raney nickel catalyst was agitated under hydrogen at forty pounds per square inch for eight hours at 20–30 degrees centigrade. The mixture was filtered, evaporated to dryness, and the residue recrystallized from a benzene-acetone mixture to obtain the desired product as a colorless crystalline solid having a melting point of 208–208.5 degrees centigrade.

Analysis.—Calculated for $C_8H_6O_2Cl_3N$: Cl, 41.8. Found: Cl, 41.4.

The compound is poorly soluble in water, but soluble in aqueous hydrochloric acid to form the soluble hydrochloride and in aqueous sodium hydroxide to form the soluble sodium salt.

Example 2

In the same manner as in Example 1, a mixture of nitrotrichlorophenylacetic acid (prepared by treating technical mixed trichlorophenylacetic acid with excess red fuming nitric acid at 50 degrees centigrade) was hydrogenated to a mixed aminotrichlorophenylacetic acid, a colorless amorphous solid. Infrared examination indicated the presence of about 50 percent of 5-amino-2,3,6-trichlorophenylacetic acid, the remainder being other isomers, principally 5-amino-2,3,4-trichlorophenylacetic acid, 3-amino-2,4,5-trichlorophenylacetic acid, and 3-amino-2,4,6-trichlorophenylacetic acid.

Example 3

A test area was seeded with soybeans, snapbeans, as representative herbicide-sensitive crops, and foxtail, crabgrass, Johnson grass, dock, mustard, and chickweed as representative weeds. The area was then sprayed with 5-amino-2,3,6-trichlorophenylacetic acid at the rate of eight pounds per acre. Soybeans and snapbeans subsequently emerged and grew without injury while each of the above-named weeds was totally controlled. An unsprayed control plot contained a vigorous growth of each of the weed species.

Similar results were obtained by use of the product of Example 2 at 14 pounds per acre.

Example 4.—Preparation of technical trichloronitrophenylacetic acid and trichloroaminophenylacetic acid Fifty parts of a mixed trichlorophenylacetic acid having the approximate isomeric composition forty to fifty percent 2,3,6-, twenty to forty percent 2,4,5-, and ten to twenty percent 2,3,5-trichlorophenylacetic acid (based on infrared analysis of the trichlorotoluenes from which it was derived) were mixed with three hundred and seventy-five parts of red fuming nitric acid and allowed to stand at room temperature for twenty-four hours. An equal volume of water was then added and the mixture was filtered and washed free of nitric acid. The product was dried in air to a constant weight and was a yellowish, crystalline solid having a neutralization equivalent of 283.5 (theoretically 284.5).

Analysis.—Calculated for $C_8H_4Cl_3NO_4$: N, 4.92; Cl, 37.5. Found: N, 4.5; Cl, 37.0.

This material was hydrogenated, as in Example 2 to a mixed amino-trichlorophenylacetic acid, a colorless amorphous solid, soluble in aqueous ammonia and caustic soda.

The product was stirred with ten parts of water and to the mixture was added a 20 percent solution of ammonia until a pH of 7–8 was reached, thereby obtaining a clear aqueous solution of the mixed ammonium aminotrichlorophenylacetate. Similarly, the acid was neutralized with aqueous caustic soda to prepare the water-soluble colorless sodium salt, with aqueous dimethylamine to prepare the water-soluble colorless dimetyhlamine salt, and with diethanolamine to prepare the water-soluble diethanolammonium salt.

The mixed aminotrichlorophenylacetic acid was dissolved in ethyl ether and treated with an ether solution of diazomethane until the color of diazomethane persisted. The methyl esters produced thereby were then resolved by gas chromatography and the various components identified by comparison of the elution times to those of pure isomers. By this means, the composition of the ester mixture (and consequently of the acid mixture) was found to comprise:

| | Percent |
|---|---|
| 5-amino-2,3,6-trichloro-isomer | 40–60 |
| 3-amino-2,4,5-trichloro-isomer | 20–30 |
| 3-amino-2,3,4-trichloro-isomer | 10–15 |

Example 5.—Preparation of the isopropyl ester and the butoxyethyl ester of aminotrichlorophenylacetic acid One hundred parts of mixed isomers of nitrotrichlorophenylacetic acid, containing forty percent 5-nitro-2,3,6-trichloro-isomer by infrared analysis, are refluxed for two hours with two hundred parts of thionyl chloride, after which the excess thionyl chloride is stripped under aspirator vacuum. The residual liquid acid chloride is added to isopropyl alcohol (two hundred parts), with cooling, at twenty-five to thrity-five degrees. After the exothermic reaction ceases, the mixture is refluxed for three hours, then the excess alcohol is stripped under aspirator vacuum. The dark oil is dissolved in four hundred milliliters of fresh isopropyl alcohol and then treated with hydrogen gas in a shaking autoclave at thirty pounds per square inch (gauge) in the presence of about five percent by weight of Raney nickel catalyst until no further hydrogen uptake occurs.

The mixture is then filtered to remove catalyst, and the solvent stripped under aspirator vacuum, leaving an amber syrup, part of which crystallizes on prolonged standing. The infrared spectrum shows the presence of the ester linkage and amino group, and the absence of the nitro group.

Analysis.—Calculated for $C_{11}H_{12}O_2NCl_3$: N, 4.72%. Found: N, 4.6%.

By substituting butoxyethanol (commercial "Butyl Cellosolve") in place of isopropyl alcohol in the above procedure, the butoxyethyl ester is made. It is a viscous oil having the expected functional groups in the infrared spectrum.

Analysis.—Calculated for $C_{14}H_{18}O_3NCl_3$: N, 3.95%. Found: N, 3.7%.

Although the above examples and descriptions of this invention has been very specifically illustrated, many other modifications will suggest themselves to those skilled in the art upon a reading of this disclosure. These are intended to be comprehended within the scope of this invention.

What is claimed is:

1. A method for the control of plant growth which comprises applying to the locus to be treated a phytotoxic amount of a mixture of compounds selected from the group consisting of aminotrihalophenylacetic acids, salts of said acids, esters of said acids, and amides of said acids, wherein the halogens of said compounds are selected from the group consisting of chlorine, bromine, and mixtures thereof, and wherein about 30 to about 75 percent of said mixture of compounds is selected from the group consisting of 5-amino-2,3,6-trihalophenylacetic acid, the salts of said acid which convert to said acid in the soil, the esters of said acid which convert to said acid in the soil and the amides of said acid which convert to said acid in the soil, and mixtures thereof.

2. The method of claim 1 wherein the remainder of the mixture, in addition to the named 30 to 75 percent, is a compound selected from the group consisting of 3-amino-2,4,5 - trihalophenylacetic acid, 3 - amino-2,4,6-trihalophenylacetic acid, 5-amino-2,3,4-trihalophenylacetic acid, the salts of said acids which convert to acids in the soil, the esters of said acids which convert to said acids in the soil, the amides of said acids which convert to said acids in the soil, and mixtures thereof.

3. The method of claim 1 wherein the aminotrihalophenylacetic acid is 5-amino-2,3,6-trichlorophenylacetic acid.

4. The method of claim 3 wherein about 30 to 75 percent of the mixture of compounds is 5-amino-2,3,6-trichlorophenylacetic acid.

5. The method of claim 1 wherein about 30 to 75 percent of the mixture is sodium - 5-amino-2,3,6-trichlorophenylacetate.

6. The method of claim 1 wherein 30 to 75 percent of the mixture is ammonium-5-amino-2,3,6-trichlorophenylacetate.

References Cited

UNITED STATES PATENTS 2,394,916 2/1946 Jones _____ 71—2.6
3,009,806 11/1961 Weil et al. _____ 71—2.6

JAMES O. THOMAS, JR., *Primary Examiner.*